US012682216B2

(12) United States Patent
San Roman Alerigi

(10) Patent No.: US 12,682,216 B2
(45) Date of Patent: Jul. 14, 2026

(54) METHOD AND SYSTEM FOR PREDICTING PROPERTIES OF ROCK SAMPLES USING THERMAL SENSING AND MACHINE LEARNING

(71) Applicant: SAUDI ARABIAN OIL COMPANY, Dhahran (SA)

(72) Inventor: Damian Pablo San Roman Alerigi, Al Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 712 days.

(21) Appl. No.: 18/309,692

(22) Filed: Apr. 28, 2023

(65) Prior Publication Data

US 2024/0361264 A1 Oct. 31, 2024

(51) Int. Cl.
*G06N 3/045* (2023.01)
*G06N 3/08* (2023.01)

(52) U.S. Cl.
CPC .............. *G06N 3/045* (2023.01); *G06N 3/08* (2013.01)

(58) Field of Classification Search
CPC .................................. G06N 3/045; G06N 3/08
See application file for complete search history.

(56) References Cited

U.S. PATENT DOCUMENTS

| 10,786,948 B2 | 9/2020 | Dave et al. |
| 10,831,949 B2 | 11/2020 | Qin et al. |
| 2006/0020563 A1 | 1/2006 | Coleman et al. |
| 2021/0340669 A1 | 11/2021 | Lindley et al. |

(Continued)

FOREIGN PATENT DOCUMENTS

CN 111257196 B 12/2020

OTHER PUBLICATIONS

Kang, Jianguo et al., "Feasibility analysis of extreme learning machine for predicting thermal conductivity of rocks"; Environmental Earth Sciences; vol. 80, Issue 13, Article: 455; pp. 1-15; Jul. 2021 (15 pages) (Year: 2021).*

(Continued)

*Primary Examiner* — Catherine T. Rastovski
*Assistant Examiner* — Nyla Gavia
(74) *Attorney, Agent, or Firm* — Osha Bergman Watanabe & Burton LLP

(57) ABSTRACT

A method may include determining a thermal signal for a thermal analysis of a rock sample. The method may further include transmitting various commands to various thermal sources to produce various heat emissions. A respective command among the commands may cause a respective thermal source among the thermal sources to produce a respective heat emission based on the thermal signal. The method further includes determining distributed temperature data of the rock sample using various distributed temperature sensors in response to producing the heat emissions. The distributed temperature sensors may be coupled to the rock sample on a first rock surface and a second rock surface. The first rock surface may be on an opposite side of the rock sample from the second rock surface. The method may further include determining predicted thermal property data of the rock sample using the distributed temperature data and a machine-learning model.

20 Claims, 10 Drawing Sheets

(56) References Cited

U.S. PATENT DOCUMENTS

2022/0034829 A1     2/2022  Yokoyama et al.
2022/0351037 A1    11/2022  Li et al.

OTHER PUBLICATIONS

Isah B.W.; Mohamad, H. Surface-Mounted Bare and Packaged Fiber Bragg Grating Sensors for Measuring Rock Strain in Uniaxial Testing. Sensors 2021, 21, 2926. (Year: 2021).*

Goutorbe, Bruno et al., "Using neural networks to predict thermal conductivity from geophysical well logs"; Geophysical Journal International; vol. 166, Issue 1; pp. 115-125; Jul. 2006 (Year: 2006).*

Kang, Jianguo et al., "Feasibility analysis of extreme learning machine for predicting thermal conductivity of rocks"; Environmental Earth Sciences; vol. 80, Issue 13, Article: 455; pp. 1-15; Jul. 2021 (15 pages).

Ducamp, Maxime et al., "Prediction of Thermal Properties of Zeolites through Machine Learning"; The Journal of Physical Chemistry C; vol. 126, Issue 3; pp. 1651-1660; Jan. 27, 2022 (33 pages).

Goutorbe, Bruno et al., "Using neural networks to predict thermal conductivity from geophysical well logs"; Geophysical Journal International; vol. 166, Issue 1; pp. 115-125; Jul. 2006 (11 pages).

Rosman, N.A. et al., "Temperature Monitoring System Using Fiber Bragg Grating (FBG) Approach"; AIP Conference Proceedings; vol. 2203, Issue 1, Article 020065; pp. 020065-1-020065-8; Jan. 8, 2020 (8 pages).

Jin, Juan et al., "Evolution of the Anisotropic Thermal Conductivity of Oil Shale with Temperature and Its Relationship with Anisotropic Pore Structure Evolution"; Energies; vol. 15, Issue 21, Article 8021; pp. 1-16; Nov. 2022 (16 pages).

Elgaud, M. M. et al., "Analysis of Independent Strain-Temperature Fiber Bragg Grating Sensing Technique Using OptiSystem and OptiGrating"; 2016 IEEE 6th International Conference on Photonics (ICP); Mar. 2016 (3 pages).

* cited by examiner

METHOD AND SYSTEM FOR PREDICTING PROPERTIES OF ROCK SAMPLES USING THERMAL SENSING AND MACHINE LEARNING

BACKGROUND

Thermal conductivity (TC) of a material may describe the rate of heat transfer through a materials' thickness as well as other thermal properties. Thus, thermal conductivity may define one of the basic transport properties that significantly affects heat transfer in a heterogenous medium. Measurement of thermal conductivity in rocks may be especially important for understanding various thermal properties of earth materials, such as characteristics of heat flow and the formation of hydrocarbon basins. In particular, the thermal conductivity of certain rock types may be used to determine the influence of such rocks on the generation and preservation of oil and gas in subterranean formations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes determining, by a computer processor, a thermal signal for a thermal analysis of a rock sample. The method further includes transmitting, by the computer processor, various commands to various thermal sources to produce various heat emissions. A respective command among the commands causes a respective thermal source among the thermal sources to produce a respective heat emission based on the thermal signal. The method further includes determining, by the computer processor, distributed temperature data of the rock sample using various distributed temperature sensors in response to producing the heat emissions. The distributed temperature sensors are coupled to the rock sample on a first rock surface and a second rock surface. The first rock surface is on an opposite side of the rock sample from the second rock surface. The method further includes determining, by the computer processor, predicted thermal property data of the rock sample using the distributed temperature data and a machine-learning model.

In general, in one aspect, embodiments relate to a system that includes various thermal sources that couple to a rock sample and a first set of distributed temperature sensors that couple to a first rock surface of the rock sample. The system further includes a second set of distributed temperature sensors that couple to a second rock surface of the rock sample. The first rock surface is on an opposite side of the rock sample from the second rock surface. The system further includes a thermal sensing manager coupled to the thermal sources, the first set of distributed temperature sensors, and the second set of distributed temperature sensors. The thermal sensing manager includes a computer processor and a machine-learning model. The thermal sensing manager determines a thermal signal for a thermal analysis of the rock sample. The thermal sensing manager transmits various commands to the thermal sources to produce various heat emissions. A respective command among the commands causes a respective thermal source among the thermal sources to produce a respective heat emission based on the thermal signal. The thermal sensing manager determines distributed temperature data of the rock sample using the first set of distributed temperature sensors and the second set of distributed temperature sensors in response to producing the heat emissions. The thermal sensing manager determining predicted thermal property data of the rock sample using the distributed temperature data and the machine-learning model.

In some embodiments, various distributed temperature sensors are disposed in a portion of an optical fiber disposed along a rock surface of a rock sample. The distributed temperature sensors may include various fiber-based distributed temperature sensors, such as Fiber Bragg Grating (FBG) sensors and various sensors based on multi-point Brillouin scattering time-domain reflectometry. The fiber-based distributed temperature sensors may determine changes in temperature at different locations in the optical fiber. The optical fiber may be optically connected to a controller that determines the distributed temperature data. In some embodiments, various distributed temperature sensors include various thermocouples disposed on a rock surface of a rock sample. The thermocouples may be electrically connected to a controller. The controller may determine distributed temperature data.

In some embodiments, a rock sample is disposed in a rock thermal measurement system that includes a container that stores the rock sample. The rock thermal measurement system may further include a controller electrically connected to various distributed temperature sensors. The controller may include a computer processor. The rock thermal measurement system may further include various distributed heatsinks disposed on a rock surface of the rock sample. A respective heatsink among the distributed heatsinks is disposed between adjacent temperature sensors among the distributed temperature sensors. In some embodiments, a lithological type of a rock sample is determined. The lithological type, distributed temperature data, and a thermal signal are inputs to a machine-learning model for predicting thermal property data and/or geological data. In some embodiments, predicted thermal property data describe a heat transfer rate in various regions in a rock sample.

In some embodiments, geological data of a rock sample are determined using predicted thermal property and reflectance spectrometry data. The geological data may include a porosity, a permeability, and a resistivity of the rock sample. In some embodiments, reflectance spectrometry data are acquired using a reflectance spectrometer, such as a Fourier transform infrared (FTIR), a Raman spectrometer, and ultraviolet-visible (UV-VIS) spectrometer. In some embodiments, a machine-learning model is a U-net model that includes an input layer, various downsampling layers, various upsampling layers, various pooling layers, and an output layer. The input layer may obtain distributed temperature data of a rock sample. The output layer may generate an image that includes various heat transfer rates in various regions of a rock sample. In some embodiments, a machine-learning model is an artificial neural network that includes various hidden layers and at least one activation function. A respective hidden layer among the hidden layers may include at least one neuron. The artificial neural network may determine a predicted amount of kerogen in a rock sample using distributed temperature data. In some embodiments, a rock sample is acquired, using a coring system from a well. The coring system may include a coring tool.

In light of the structure and functions described above, embodiments of the invention may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1A:
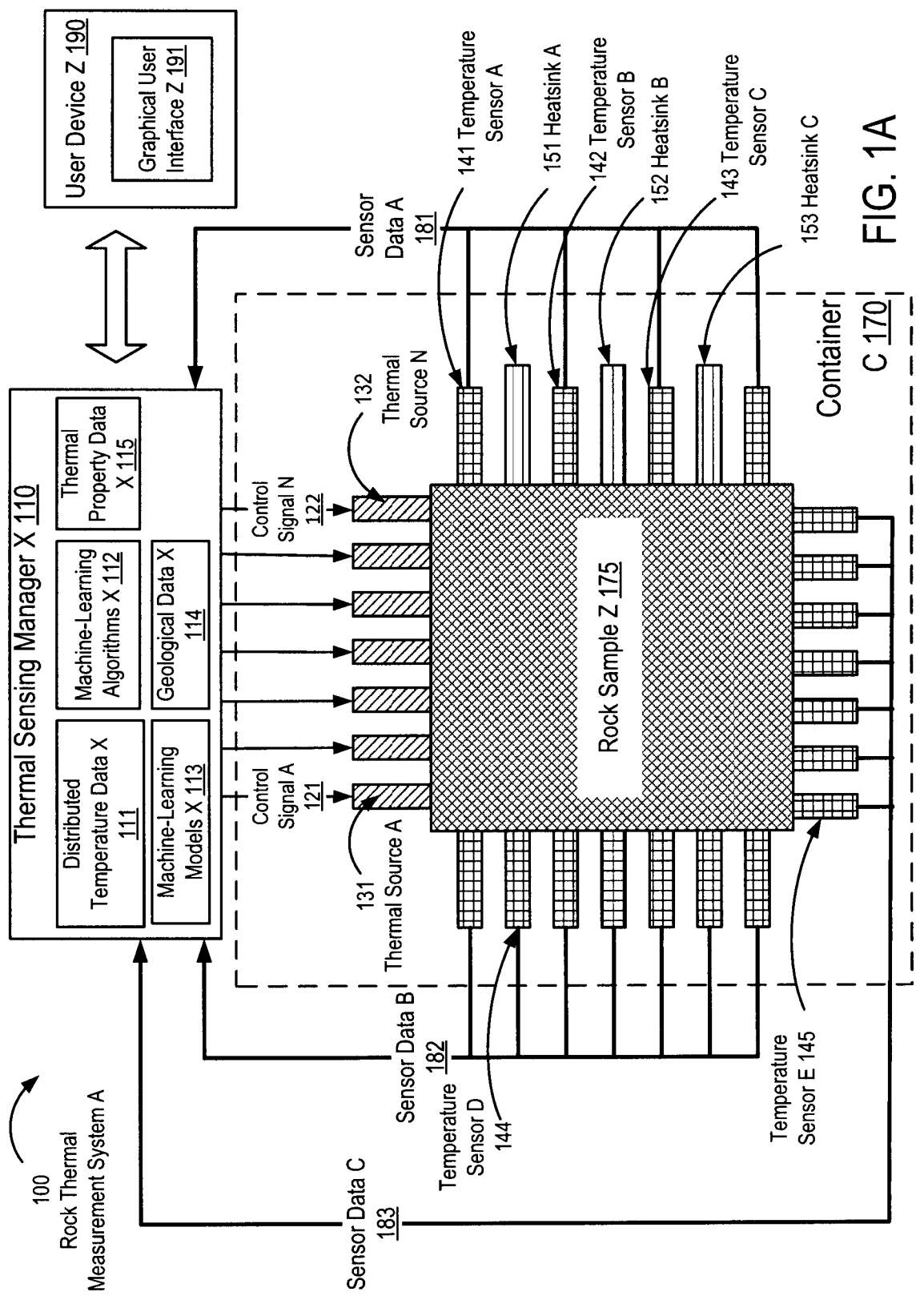
FIGS. 1A, 1B, and 2 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for determining thermal property data and/or geological data of rock samples or other heterogeneous solids using machine learning and distributed temperature data. In some embodiments, for example, a multi-point measurement setup is implemented using multiple thermal sources disposed along a specific boundary of a rock sample. The rock sample may be a heterogenous solid, such as a sedimentary rock acquired from a well site or elsewhere in the field. Additionally, the specific boundary of the rock sample may include one or more rock surfaces in contact or in a specific proximity with the thermal sources. This multi-point measurement setup may also have various temperature sensors disposed along one or more boundaries of the rock sample to collect distributed temperature data in response to excitations of the thermal sources throughout a thermal analysis. For example, distributed temperature data may include real-time thermograms, infrared images, sensor data from different thermocouples, and/or data acquired by a distributed temperature sensor (DTS) (e.g., a distributed sensor implemented within an optical fiber).

Similar to acoustic inversion, various thermal sources may excite a thermal response on the rock sample using various thermal signals, such as predetermined heat waves and other heat emissions. This thermal response may be recorded using the temperature sensors at different time intervals in order to determine thermal property data and/or geological data regarding the rock sample. In other words, temperature data may be acquired from a rock sample for use as inputs to a machine learning architecture to predict properties of the rock sample. Examples of thermal properties may include thermal coefficients, heat capacities of different locations, heat transfer rates, and temperature gradients. Furthermore, machine learning may enable the rapid characterization of these thermal properties of rocks in both the laboratory and the field. For example, certain thermal conductivities may be used to identify and describes various materials in hydrocarbon formations, such as kerogens, bitumen, and oils, for adjusting oil field operations.

Likewise, some embodiments also use distributed temperature data from the multi-point measurement setup to predict geological data, such as geomechanical and geochemical properties of the rock sample. As such, a machine-learning model for predicting thermal properties may also be integrated into one or more machine-learning workflows for predicting geological data, such as using additional input features (e.g., a known lithological classification of the formation associated with the rock sample). Another possible application of this machine-learning workflow includes the characterization of unconventional reservoirs. In particular, the characterization of unconventional reservoirs may be improved using more accurate thermal property data of rock samples from the particular reservoir under analysis. This thermal data may be critical to assess the maturity and organic composition of the rock specimen. Various technique may be further supplemented with additional electromagnetic or acoustic sensor inputs distributed in a similar fashion as the thermal sources and sensors (e.g., in a similar manner as the thermal sources and temperature sensors described in FIG. 1A below). Additionally, distributed spectroscopic or hyperspectral methods may be used to obtain spectrograms of the rock under analysis during exposure to the probe signals (e.g., heat, electromagnetic, or acoustic inputs).

Figure 1B:
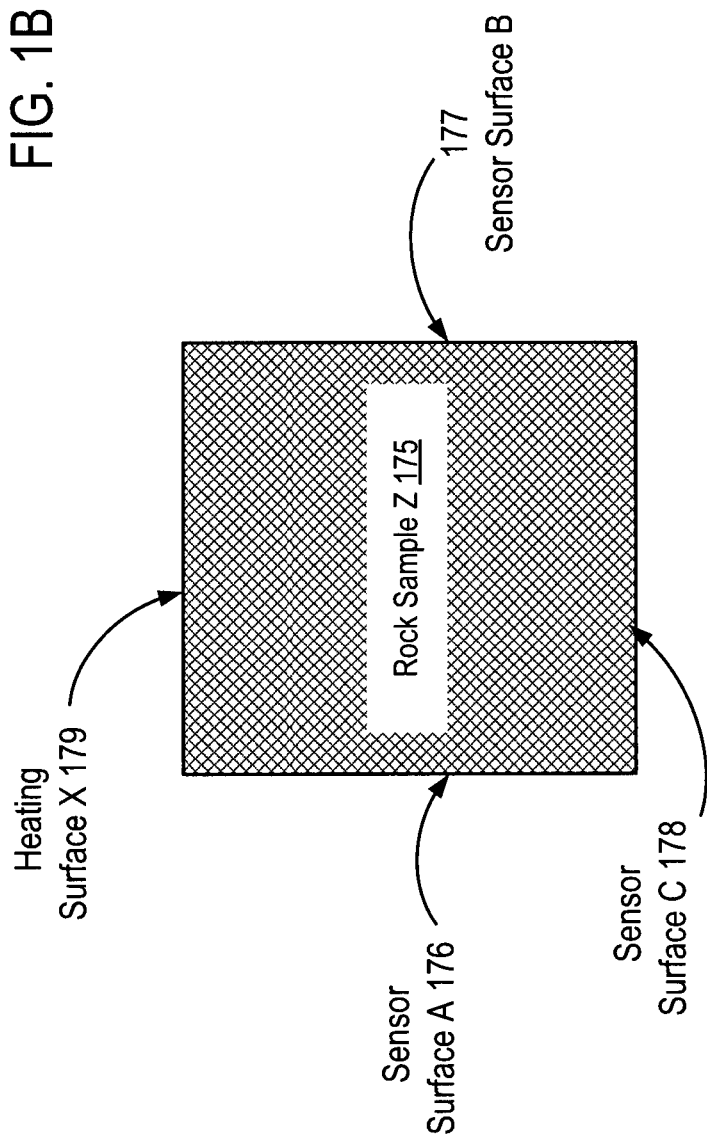

Turning to FIGS. 1A-1B, FIG. 1A shows a schematic diagram in accordance with one or more embodiments. As shown in FIG. 1A, a rock thermal measurement system (e.g., rock thermal measurement system A (100)) may perform a thermal analysis on a rock sample (e.g., rock sample Z (175)). In particular, a rock thermal measurement system may include various thermal sources (e.g., thermal source A (131), thermal source N (132)), various temperature sensors (e.g., temperature sensor A (141), temperature sensor B (142), temperature sensor C (143), temperature sensor D (144), temperature sensor E (145)), one or more heatsinks (e.g., heatsink A (151), heatsink B (152), heatsink C (153)), a container (e.g., container C (170)), and/or one or more user devices (e.g., user device Z (190)). In some embodiments, a rock thermal measurement system includes a thermal sensing manager (e.g., thermal sensing manager X (110)) that includes hardware and/or software with functionality for transmitting control signals (e.g., control signal A (121), control signal N (122)) for producing a predetermined thermal response based on one or more thermal signals applied to the rock sample. Likewise, the thermal sensing manager may also acquire sensor data from one or more temperature sensors (e.g., temperature sensors (141, 142, 143, 144, 145)) in response to the applied thermal signals. A thermal sensing manager may be a hardware controller, a server, or a control system coupled to various thermal sources and/or thermal sensors in the rock thermal measurement system. A rock sample may be a heterogenous solid acquired from an exploratory well, such through a coring technique or from drilled cuttings. However, other types of rock samples are contemplated for analysis, such as for geological applications outside oil and gas industry. The rock sample may couple with various components in the rock thermal measurement system either using direct contact surfaces or additional hardware that keeps certain components (e.g., thermal sources, temperature sensors, heatsinks, etc.) in a predetermined proximity from a boundary of the rock sample.

Turning to thermal sources, various thermal sources may provide a distributed thermal pulse excitation as the thermal signals for producing a particular thermal response in a rock sample. For example, distributed thermal sources may include multiple thermal sources that are disposed along one or more boundary sections (e.g., one or more surfaces) of a rock sample to produce a predetermined heat wave or pattern on the boundary sections. By exciting one or more heat wave with specific properties, various heat emissions (i.e., the respective thermal signal) may propagate in a solid. These propagated heat emissions may thereby cause temperature changes over time that are captured by various temperature sensors. For example, a thermal source includes an electromagnetic heat source. An electromagnetic heat source may transmit an electromagnetic wave at a low-frequency or higher radio frequencies to produce a particular heating scheme in a boundary section. One specific example of an electromagnetic heat source is an induction heater. An induction heater may include an electromagnet and an electronic oscillator that passes a high-frequency alternating current (AC) through the electromagnet to heat a conductive metal. In some embodiments, terahertz dielectric heating is used, for example, based on microwaves or lasers to heat some section of the sample. Dielectric heating techniques may target the rock sample directly or use a material chosen to have a resonance frequency in accordance with the frequency of the excitation source. This material would be applied to the heating areas of the rock. The sample material may be required to have a high thermal conductivity, low heat capacity, and high electromagnetic absorbance (e.g. CuSiC, SiC, CuC, Ag nanoparticles, C nanoparticles, etc.).

Keeping with thermal sources, thermal sources may also include one or more resistive heat sources. A resistive heat source may use an electric current to produce heat in response to a particular electrical resistance. For example, a resistive heat source may include a heater, one or more heat-transfer members, and one or more heat insulators that cover heat-transfer members to prevent heat loss through radiation and ambient atmosphere. Heat may enter a rock sample at a contact surface or proximate a contact surface between a heat-transfer member and a rock sample.

Turning to temperature sensors, temperature sensors may be distributed along one or more boundaries of a rock sample to capture distributed temperature data over a predetermined period of time. For example, temperature sensors may acquire temperature measurements at different points of a rock sample for a specific time interval. Specifically, the time interval may be least one order of magnitude larger than a thermal time of the rock sample. Examples of temperature sensors may include various types of thermocouples, fiber optic sensors, and thermal imaging cameras that acquire infrared (IR) images of different portions of a rock sample. Turning to thermocouples, a thermocouple may be a sensor that includes two different types of metals joined at a specific junction. When the junction of the two metals is heated or cooled, a voltage may be produced that determines a temperature of the thermocouple.

Turning to fiber optic sensors, some embodiments include one or more optical fibers with distributed reflectors for implementing temperature sensors throughout the respective optical fiber. An example of a fiber optic sensor may be a distributed temperature sensing (DTS) device, where the DTS device includes an optical fiber with one or more fiber optic probes attached to one or more temperature transmitters (also called "signal conditioners"). The optical fiber in the DTS device may thereby function as a series of linear temperature sensors that produce a continuous temperature profile along an entire length of the optical fiber. Moreover, a DTS device may also be based on the Raman effect to measure temperature. In a Raman effect sensor, an optical laser pulse may be transmitted through the optical fiber resulting in some scattered light reflecting back to a transmitting end of the optical fiber. In Optical Time Domain Reflectometry (OTDR), for example, various positions of temperature measurements may be determined by analyzing arrival times of returning light pulses. In some embodiments, a DTS device may also be accomplished using an optical time domain reflectometry based on a Brillouin scattered signal, e.g., as used in various oil and gas implementations.

Keeping with fiber optic sensors, a fiber optic sensor may also include a Fiber Bragg Grating (FBR) element that determines changes in temperature based on shifts in reflected wavelengths of light inside the optical fiber. For example, a Fiber Bragg Grating (FBG) element may be one type of distributed Bragg reflector that is disposed in a particular segment of an optical fiber. By producing a periodic pattern in the refractive index of the fiber core for a short fiber length (e.g., 1 cm), the FBG element may operate as an optical filtering device that only reflects certain optical signals at certain wavelengths within the fiber's core. As such, the refractive index and the grating period in an FBG element may be sensitive to changes in temperature and thus result in changes of the wavelength shift. Optical fiber temperature sensors may include various components, such as bias generators, spatial light-emitting diodes (LEDs), distributed-feedback (DFB) lasers, isolators, uniform FBG elements, optical couplers, and one or more optical spectrum analyzers.

Turning to thermal imaging cameras, a thermal imaging camera may include hardware and/or software for temperature sensing that converts infrared (IR) radiation into visible images depicting temperature differences. For example, a thermal imaging camera may include one or more infrared detectors, such as a focal plane array with micron-size detecting elements. Likewise, thermal image cameras may be short-wave IR (SWIR), mid-wave IR (MWIR), or long-wave IR (LWIR) cameras. Mid-wave IR cameras may include mid-wave sensors that require cooling into specific cold temperatures, while long-wave IR cameras may require no specific cooling for operation. Mid-wave IR cameras may operate on quantum principles, where input photons may interact with electrons in the mid-wave sensors. On the other hand, long-wave IR cameras may receive infrared energy that warms up one or more IR detectors.

In some embodiments, a rock thermal measurement system includes various distributed heatsinks (e.g., heatsink A (151), heatsink B (152), heatsink C (153)) disposed along one or more boundaries of a rock sample. A heatsink may be a solid element of predetermined thermal properties that act as a constant temperature point or section distributed along one or more boundaries of a rock sample. In other words, distributed heatsinks may be placed at various locations along one or more boundaries of a rock sample in order to set a predetermined temperature or force a desired temperature gradient in a thermal analysis. For example, distributed heatsinks may be disposed between adjacent temperature sensors and/or adjacent thermal sources to further control a thermal analysis of a rock sample. Furthermore, a heatsink may be a metal component that increases heat flow away from the rock sample. In a direct heatsink-contact application, heat energy may move into the heatsink and away from the rock sample via natural conduction, such as moving across the thermal gradient from a high temperature to a low-temperature environment. Likewise, passive heatsinks may be used that rely on natural convection, while active heatsinks may be used that include mechanical devices, such as a fan, water pump, or air blower that enhances heat flow from the rock sample. In some embodiments, a heatsink is electrically connected to a temperature sensor to determine the heatsink's temperature throughout a thermal analysis of the rock sample. For illustration, a Raman-based distributed temperature sensor may be used in real-time for continuous heatsink temperature monitoring throughout the thermal analysis.

Keeping with FIGS. 1A-1B, a thermal sensing manager (e.g., thermal sensing manager X (110)) may include hardware and/or software for controlling one or more thermal sensors, one or more temperature sensors, and one or more distributed heatsinks. For example, a thermal sensing manager may transmit one or more control signals (e.g., control signal A (121), control signal N (122)) to respective thermal sources to produce a predetermined thermal response in a rock sample. For example, control signals may be electrical power signals that provide the electrical energy for producing heat waves applied to one or more surfaces. Likewise, control signals may also be commands with functionality for initiating and/or terminating heat operations in a thermal source that uses a different energy source. A command may be a network message that is transmitted over a machine-to-machine network protocol for adjusting various parameters in a thermal source and/or temperature sensor for automatically triggering one or more thermal analysis operations. While control signals are only shown being transmitted to thermal sources in FIG. 1A, other embodiments are contemplated where the thermal sensing manager transmits signals to temperature sensors and/or distributed heatsinks in order to manage a thermal analysis of the rock sample.

In some embodiments, a thermal sensing manager includes a photonics device (also referred to as a "laser box"). This photonics device may be a controller that includes one or more photonic circuits that include one or more laser sources, an autocorrelator, one or more OTDR modules, and a spectral signal analyzer among other electro-photonic components. Likewise, various control signals may include optical signals transmitted to one or more thermal sources and/or one or more fiber-based temperature sensors.

Furthermore, a thermal sensing manager may manage thermal energy to a rock sample along one or more rock surfaces through thermal pulses, in increasing energy steps, and/or through a ramping process. For example, thermal signals may release heat energy into the rock sample with periodic or aperiodic timing and/or varying amplitudes. As such, a thermal sensing manager may produce simultaneous heat transfer using multiple thermal sources, while also acquiring temperature measurements at multiple boundary locations one or more surfaces of a rock sample.

In some embodiments, a thermal sensing manager determines predicted thermal property data (e.g., thermal property data X (115) based on distributed temperature data (e.g., distributed temperature data X (111)) for one or more rock samples. Thermal properties may describe a material-dependent response when heat is supplied to a solid body, a liquid, or a gas. As such, examples of thermal properties include thermal conductivity of different regions in a rock sample, temperature gradients, phase transitions, changes in length or volume of a rock sample, an initiation of one or more chemical reactions, as well as other change in a physical or chemical quantity based on a thermal excitation. Using machine learning, a thermal sensing manager may perform a thermal inversion of the rock sample using distributed temperature data similar to acoustic inversion. Based on the predetermined thermal response achieved by the thermal sources and sensor data collected at different points along one or more boundaries, a trained machine-learning model may be used to determine various thermal properties of the rock sample. As such, distributed temperature data collected over time during a thermal analysis may provide inputs for the trained machine-learning model for predicting thermal properties.

Keeping with thermal properties, thermal conduction may correspond to the rate that heat is transferred through a solid material. Thermal or heat conduction may be proportional to the negative of a temperature gradient as well as the area through which heat flows. For example, the heat conductivity of metals may be attributed to the presence of free electrons, which may be somewhat proportional to electrical conductivity. With an increase in temperature, the electrical conductivity of a pure metal may decrease, while the heat conductivity of non-metals may be unaffected by their electrical conductivities. Moreover, some solids demonstrate thermal anisotropy, where the direction that heat flows may be different from the temperature gradient's direction. As such, a thermal analysis with a rock measurement sensing system may be used to determine similar thermal properties of a particular rock sample.

In some embodiments, a thermal sensing manager determines predicted geological data (e.g., geological data X (114)) based on distributed temperature data (e.g., distributed temperature data X (111)) for one or more rock samples. For example, geological data may describe one or more formations within the subsurface, such as for hydrocarbon exploration. Thus, geological data may be used to describe various formation characteristics of interest, such as using rock porosity, rock permeability, resistivity, density, water saturation, and the like. Porosity may indicate how much space exists in a particular rock within an area of interest in the formation, where oil, gas, and/or water may be trapped. Permeability may indicate the ability of liquids and gases to flow through the rock within the area of interest. Resistivity may indicate how strongly rock and/or fluid within the formation opposes the flow of electrical current. Effective porosity may refer to that portion of the total void space of a porous material that is capable of transmitting a fluid. Effective permeability may refer to a state effective permeability as a function of a rock's absolute permeability. Water saturation may indicate the fraction of water in a given pore space. Depending on the rock type within a particular formation, thermal property data may be used to predict corresponding geological characteristics of individual rocks or formations accordingly with or without an additional machine-learning workflow.

In FIGS. 1A-1B, for example, thermal sources are disposed along a heating surface X (179), while sensor data (i.e., sensor data A (181), sensor data B (182), sensor data C (183)) are acquired from sensor surface A (176), sensor surface B (177), and sensor surface C (178) from various temperature sensors (e.g., temperature sensors (141, 142, 143, 144, 145). As such, a thermal sensing manager X (110) may obtain distributed temperature data of a particular thermal response for multiple boundaries of rock sample Z (175). In FIGS. 1A-1B, the boundaries correspond to different surfaces of rock sample Z (175), but other embodiments are contemplated where temperature sensors are not directly coupled to rock surfaces as well as internal temperature measurements of a rock sample are acquired for use in recording a thermal response.

In some embodiments, a thermal sensing manager includes hardware and/or software with functionality for generating and/or updating one or more machine-learning models (e.g., machine-learning models X (113)). For example, different types of machine-learning models may be trained, such as convolutional neural networks, deep neural networks, recurrent neural networks, autoencoders, generative adversarial networks (GANs), support vector machines, decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include support vector machines and neural networks. In some embodiments, the thermal sensing manager may generate augmented data or synthetic data to produce a large amount of interpreted data for training a particular model. Likewise, a thermal sensing manager may obtain a variety of image data and physical site data for validating predicted thermal property data and/or predicted geological data.

In some embodiments, various types of machine learning algorithms (e.g., machine-learning algorithms X (112)) may be used to train the model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the machine-learning model (e.g., one of machine-learning models X (113)).

In some embodiments, a machine-learning model is trained using multiple epochs. For example, an epoch may be an iteration of a model through a portion or all of a training dataset. As such, a single machine-learning epoch may correspond to a specific batch of training data, where the training data is divided into multiple batches for multiple epochs. Thus, a machine-learning model may be trained iteratively using epochs until the model achieves a predetermined criterion, such as predetermined level of prediction accuracy or training over a specific number of machine-learning epochs or iterations. Thus, better training of a model may lead to better predictions by a trained model.

With respect to artificial neural networks, for example, an artificial neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the artificial neural network. Likewise, these weighted data inputs may be summed such that this sum is communicated through a neuron's activation function to other hidden layers within the artificial neural network. As such, the activation function may determine whether and to what extent an output of a neuron progresses to other neurons where the output may be weighted again for use as an input to the next hidden layer.

In a deep neural network, for example, a layer of neurons may be trained on a predetermined list of features based on the previous network layer's output. Thus, as data progresses through the deep neural network, more complex features may be identified within the data by neurons in later layers. Likewise, a U-net model or other type of convolutional neural network model may include various convolutional layers, pooling layers, fully connected layers, and/or normalization layers to produce a particular type of output. Thus, convolution and pooling functions may be the activation functions within a convolutional neural network. On the other hand, a generative adversarial network may include a generator model that learns to generate plausible data and a discriminator model that learns to distinguish the generator's fake data from real data. Likewise, an autoencoder may be a type of artificial neural network that learns specific codings of unlabeled data (e.g., using unsupervised learning), where the autoencoder may implement an encoding function that transforms the input data, and a decoding function that recreates the input data from the encoded representation. Examples of autoencoders include denoising autoencoder, sparse autoencoders, deep autoencoders, contractive autoencoders, undercomplete autoencoders, convolutional autoencoders, and variational autoencoders. In some embodiments, a thermal sensing manager uses a trained model to determine predicted thermal properties and/or geological properties of one or more rock samples.

Turning to recurrent neural networks, a recurrent neural network (RNN) may perform a particular task repeatedly for multiple data elements in an input sequence (e.g., a sequence of temperature values from an inlet to an outlet), with the output of the recurrent neural network being dependent on past computations. As such, a recurrent neural network may operate with a memory or hidden cell state, which provides information for use by the current cell computation with respect to the current data input. For example, a recurrent neural network may resemble a chain-like structure of RNN cells, where different types of recurrent neural networks may have different types of repeating RNN cells. Likewise, the input sequence may be time-series data, where hidden cell states may have different values at different time steps during a prediction or training operation. For example, where a deep neural network may use different parameters at each hidden layer, a recurrent neural network may have common parameters in an RNN cell, which may be performed across multiple time steps. To train a recurrent neural network, a supervised learning algorithm such as a backpropagation algorithm may also be used. In some embodiments, the backpropagation algorithm is a backpropagation through time (BPTT) algorithm. Likewise, a BPTT algorithm may determine gradients to update various hidden layers and neurons within a recurrent neural network in a similar manner as used to train various deep neural networks. In some embodiments, a recurrent neural network is trained using a reinforcement learning algorithm such as a deep reinforcement learning algorithm.

Embodiments are contemplated with different types of RNNs. For example, classic RNNs, long short-term memory (LSTM) networks, a gated recurrent unit (GRU), a stacked LSTM that includes multiple hidden LSTM layers (i.e., each LSTM layer includes multiple RNN cells), recurrent neural networks with attention (i.e., the machine-learning model may focus attention on specific elements in an input sequence), bidirectional recurrent neural networks (e.g., a machine-learning model that may be trained in both time directions simultaneously, with separate hidden layers, such as forward layers and backward layers), as well as multidimensional LSTM networks, graph recurrent neural networks, grid recurrent neural networks, transformer models, etc. With regard to LSTM networks, an LSTM cell may include various output lines that carry vectors of information, e.g., from the output of one LSTM cell to the input of another LSTM cell. Thus, an LSTM cell may include multiple hidden layers as well as various pointwise operation units that perform computations such as vector addition.

In some embodiments, a transformer neural network (hereinafter "transformer model") is used to determine predicted thermal property data and/or geological data for a rock sample. A transformer model may be based on a sequence-to-sequence (Seq2Seq) architecture that transforms a given sequence of elements (e.g., a sequence of words in a sentence) into another sequence. For example, a Seq2Seq model may include an encoder and a decoder, where the encoder obtains the input sequence and maps the input sequence into a higher dimensional space. An abstract vector in the higher dimensional space may be provided to the decoder to produce a predicted output sequence. In particular, a transformer may include an attention-mechanism that analyzes a portion of an input sequence and determines at a particular step which other parts of the input sequence are relevant. As such, an attention-mechanism may determine a predicted output based on several other relevant inputs at the same time and attribute different weights to the other relevant inputs. Thus, a decoder may take as an input the encoded input sequence from an encoder and the weights provided by the attention-mechanism. In other words, transformer models may use a self-attention (intra-attention) mechanism that eliminates recurrent operations and is thus repurposed to determine the latent space representation of both the encoder and the decoder sides. With the absence of recurrence, positional-encoding may be added to the input and output embeddings of a transformer model. The positional information may thereby provide the transformer model with the order of input and output sequences.

Keeping with transformer models, a transformer model may pass an input sequence parallelly so that various parallel processors (e.g., processors in a graphical processing unit (GPU) can be used effectively and the speed of training can also be increased. In some embodiments, a transformer model is organized as a stack of encoder-decoder networks that works in an auto-regressive way, using a previously generated symbol as input for the next prediction. Decoders and encoders may include a multi-head self-attention layer and a position wise feed-forward network (FFN) layer. The multi-head sub-layer may use multiple attention functions, while the FFN sub-layer is a fully connected network used to process the attention sublayers. For example, an FFN sub-layer may apply two linear transformations on each position and a ReLU activation function.

In some embodiments, a thermal sensing manager uses one or more ensemble learning methods in connection to the machine-learning models. For example, an ensemble learning method may use multiple types of machine-learning models to obtain better predictive performance than available with a single machine-learning model. In some embodiments, for example, an ensemble architecture may combine multiple base models to produce a single machine-learning model. One example of an ensemble learning method is a BAGGing model (i.e., BAGGing refers to a model that performs Bootstrapping and Aggregation operations) that combines predictions from multiple neural networks to add a bias that reduces variance of a single trained neural network model. Another ensemble learning method includes a stacking method, which may involve fitting many different model types on the same data and using another machine-learning model to combine various predictions.

Furthermore, a user device (e.g., user device Z (190)) may communicate with a thermal sensing manager regarding the results of a particular thermal analysis on one or more rock samples. For example, a user may input a user selection of a specific type of thermal analysis (e.g., based on a specific arrangement of distributed temperature sensors and/or a specific type of thermal response produced by various thermal sources) in a graphical user interface (e.g., graphical user interface Z (191)) to transmit a request for thermal property data and/or geological property data. User devices (e.g., user device Z (190)) may include personal computer, smartphones, tablets, human machine interfaces (HMIs), and/or other types of computer devices. A thermal sensing manager and/or a user may include a computer system similar to the computer system (602) described below in FIG. 6 and the accompanying description.

Figure 2:
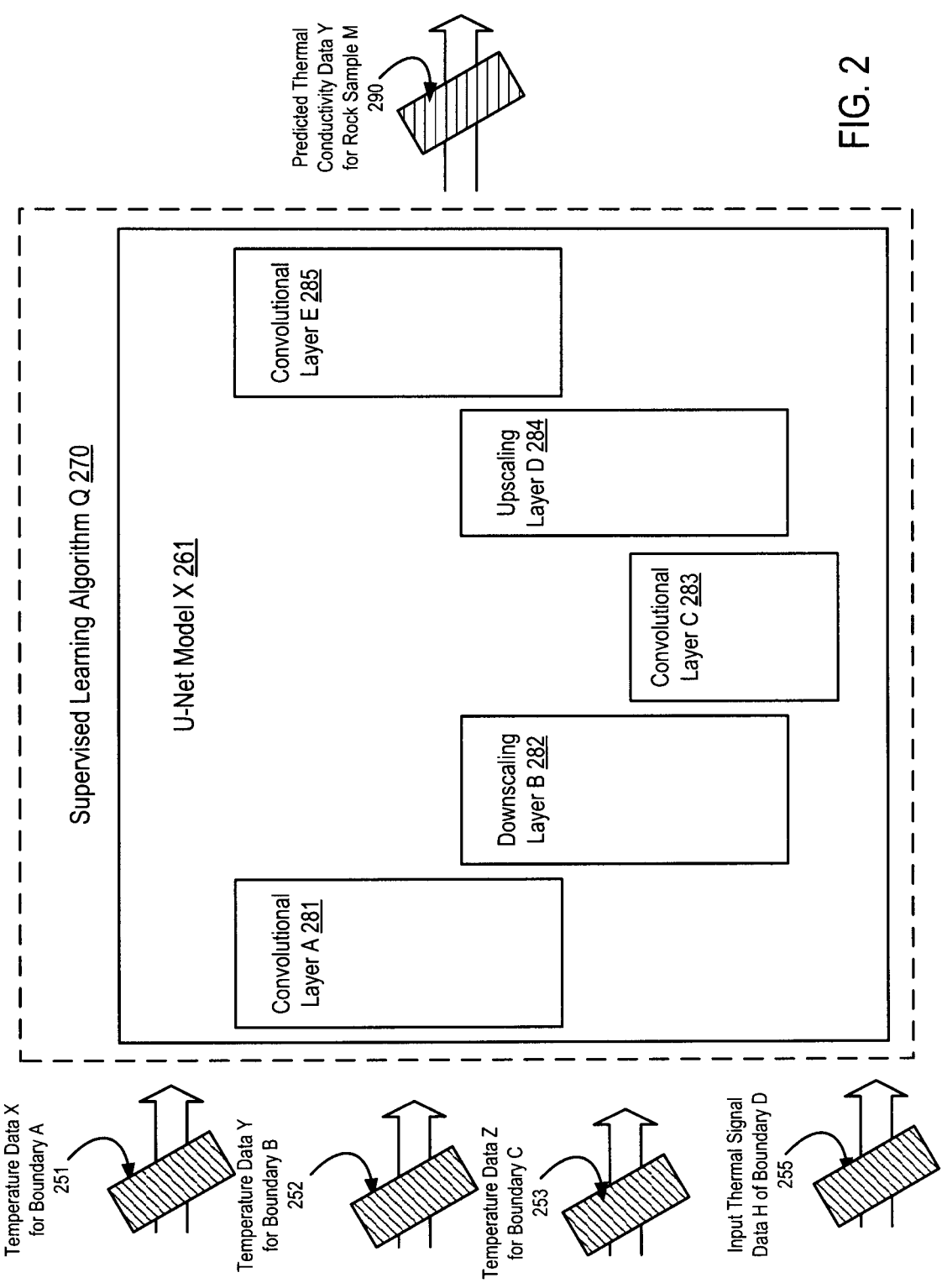

Turning to FIG. 2, FIG. 2 provides an example of using a U-Net model to predict thermal conductivity data of a rock sample. The following example is for explanatory purposes only and not intended to limit the scope of the disclosed technology. In FIG. 2, a rock sample (not shown) has distributed temperature sensors disposed proximate three different boundaries, i.e., boundary A, boundary B, and boundary C of a rock sample M. Additionally, a U-Net model X (261) is trained using a supervised learning algorithm Q (270) for predicting thermal conductivity data based on input distributed temperature data and input thermal signal data. In particular, the U-Net model X (261) includes five hidden layers, i.e., three convolutional layers (i.e., convolutional layer A (281), convolutional layer C (283), convolutional layer E (285)), a downscaling layer B (282), and an upscaling layer D (284). Moreover, the U-Net model X (261) obtains temperature data along each boundary of the rock sample, i.e., temperature data X (251), temperature data Y (252), and temperature data Z (253), and input thermal signal data H (255) as inputs for predicting thermal conductivity data Y (290). In particular, the input thermal signal data H (255) describes a series of heat pulses applied to boundary D of rock sample M in conjunction with acquiring the distributed temperature data for the other boundaries of rock sample M.

Keeping with FIG. 2, the U-Net model X (261) includes a contracting path (left side) and an expansive path (right side). In the contracting path, the U-Net model X (261) corresponds to a convolutional network architecture, where various rectified linear units (not shown) and max pooling operations (not shown) produce a downsampled description of predetermined features (e.g., a feature map) for representing thermal conductivity data. As such, feature channels may be increase during the contracting path. In the expansive path, a feature map is upsampled that decreases the number of feature channels. At the final layer (i.e., convolutional layer E (285), the resulting feature map is associated with a desired number of classes that describe thermal properties of rock sample M.

While FIGS. 1A, 1B, and 2 shows various configurations of components, other configurations may be used without departing from the scope of the disclosure. For example, various components in FIGS. 1A, 1B, and 2 may be combined to create a single component. As another example, the functionality performed by a single component may be performed by two or more components.

Figure 3:
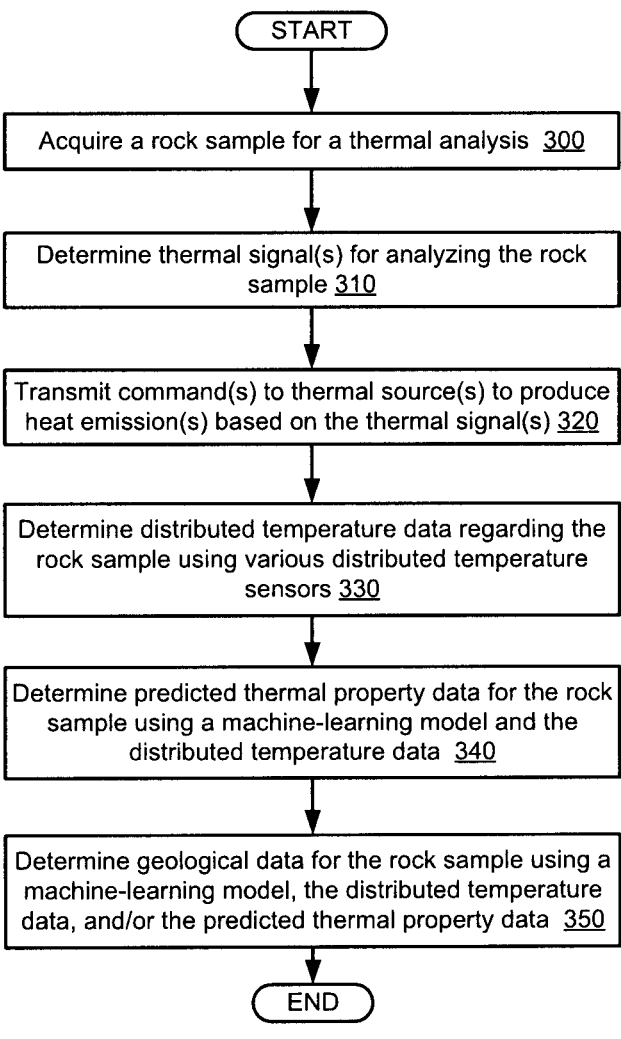
FIG. 3 shows a flowchart in accordance with one or more embodiments.

Turning to FIG. 3, FIG. 3 shows a flowchart in accordance with one or more embodiments. Specifically, FIG. 3 describes a general method for determining predicted thermal property data and/or predicted geological data using distributed temperature data. One or more blocks in FIG. 3 may be performed by one or more components (e.g., thermal sensing manager X (110)) as described in FIGS. 1A, 1B, and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, a rock sample is acquired for a thermal analysis in accordance with one or more embodiments. For example, the rock sample may be disposed in a predetermined shape (e.g., cylindrical, cubic, disc-shaped, etc.) in a suitable container for analysis by a rock thermal measurement system. Moreover, the thermal analysis may be performed in order to determine various thermal properties and/or various geological properties of the rock sample.

In some embodiments, the rock sample is a core sample acquired from a well site of an exploratory well. For example, the core sample may be acquired via a coring system that includes one or more coring tools. Coring operations may include physically extracting a rock specimen from a region of interest within a wellbore for detailed laboratory analysis. When drilling an oil or gas well, a coring system may include a coring bit that cuts core plugs (or "cores" or "core specimens") from a formation and the core plugs may be brought to the surface. These core specimens may be analyzed at the surface (e.g., in a lab) to determine various characteristics of the formation at the location where the specimen was obtained.

Turning to various coring technique examples, conventional coring may include collecting a cylindrical specimen of rock from the wellbore using a core bit, a core barrel, and a core catcher. The core bit may have a hole in its center that allows the core bit to drill around a central cylinder of rock. Subsequently, the resulting core specimen may be acquired by the core bit and disposed inside the core barrel. More specifically, the core barrel may include a special storage chamber within a coring tool for holding the core specimen. Furthermore, the core catcher may provide a grip to the bottom of a core and, as tension is applied to the drill string, the rock under the core breaks away from the undrilled formation below a coring tool. Thus, the core catcher may retain the core specimen to avoid the core specimen falling through the bottom of the drill string.

In Block 310, one or more thermal signals are determined for analyzing a rock sample in accordance with one or more embodiments. More specifically, thermal signals may correspond to various heat emissions that result in a specific thermal signature being applied to a rock sample in a thermal analysis. For example, thermal signals may include shorter energy pulses for a specimen in close proximity to the excited thermal sources (e.g., directly to a rock sample surface), while longer energy pulses may be associated with thermal signals generated with higher decoupling. Likewise, thermal signals may be selected based on a type of thermal analysis as well as the type of rock being analyzed. Moreover, a machine-learning model may use multiple thermal signal types to accurately model thermal properties and/or geological properties of a rock sample.

In Block 320, one or more commands are transmitted to one or more thermal sources to produce one or more heat emissions based on one or more thermal signals in accordance with one or more embodiments. For example, commands may cause thermal sources to initiate heat emissions and/or terminate heat emissions. The commands may be similar to the commands (121, 122) as described above in FIGS. 1A-1B and the accompanying description.

In Block 330, distributed temperature data are determined regarding a rock sample using various distributed temperature sensors in accordance with one or more embodiments. For example, distributed temperature data may be similar to the distributed temperature data described above in FIGS. 1A-1B and the accompanying description.

In Block 340, predicted thermal property data are determined for a rock sample using a machine-learning model and distributed temperature data in accordance with one or more embodiments. In particular, the machine-learning model may be an artificial neural network (e.g., an autoencoder, a generative adversarial network (GAN), a convolution neural network (CNN)) that is trained using a training dataset based on various thermal properties and boundary temperatures pairs. Thus, various underlying thermal features may be identified using machine learning. For example, predicted thermal property data may identify different heat transfer rates of different regions in a rock specimen, as well as any direction-dependent properties, such as a specific thermal anisotropy. Likewise, thermal properties may also include thermal diffusion coefficients, thermal gradients, and specific heat capacities for specific temperatures and atmospheric pressures.

In some embodiments, for example, a U-net model is trained using an 1-2 norm as the loss function to produce a trained model for predicting thermal conductivity of different locations in a rock sample. Thus, the training data may include data describing various input thermal signals from various thermal sources and corresponding distributed temperature data. More specifically, a U-net model may have a deep neural network architecture that includes functionality for classifying and/or segmenting images or volumes of distributed temperature data.

Furthermore, a machine-learning model may be trained using acquired data from a rock thermal measurement system and corresponding distributions of verified thermal properties in multiple rock samples. The rock thermal measurement system may be similar to the rock thermal measurement system A (100) described above in FIGS. 1A-1B and the accompanying description. As such, a machine-learning model may be based on a predetermined distribution of thermal sources, heatsinks, and temperature sensors on predetermined boundaries. In some embodiments, various distributions of thermal properties in multiple rock samples may be produced using synthetic data, augmented data, and/or acquired data from various actual specimens.

Figure 4A:
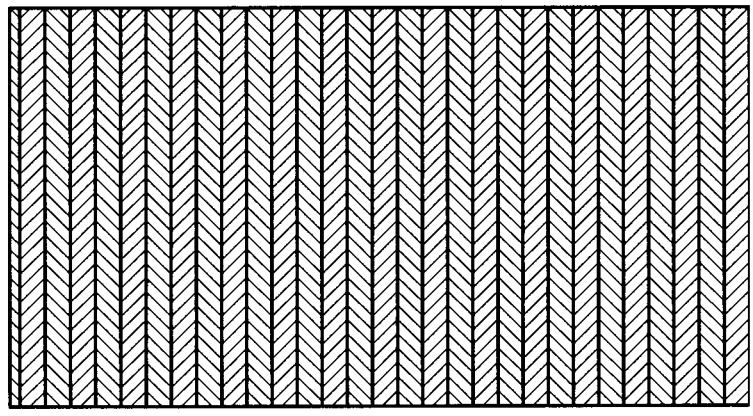
FIGS. 4A, 4B, 4C, 4D, 5A, and 5B show examples in accordance with one or more embodiments.
Figure 4B:
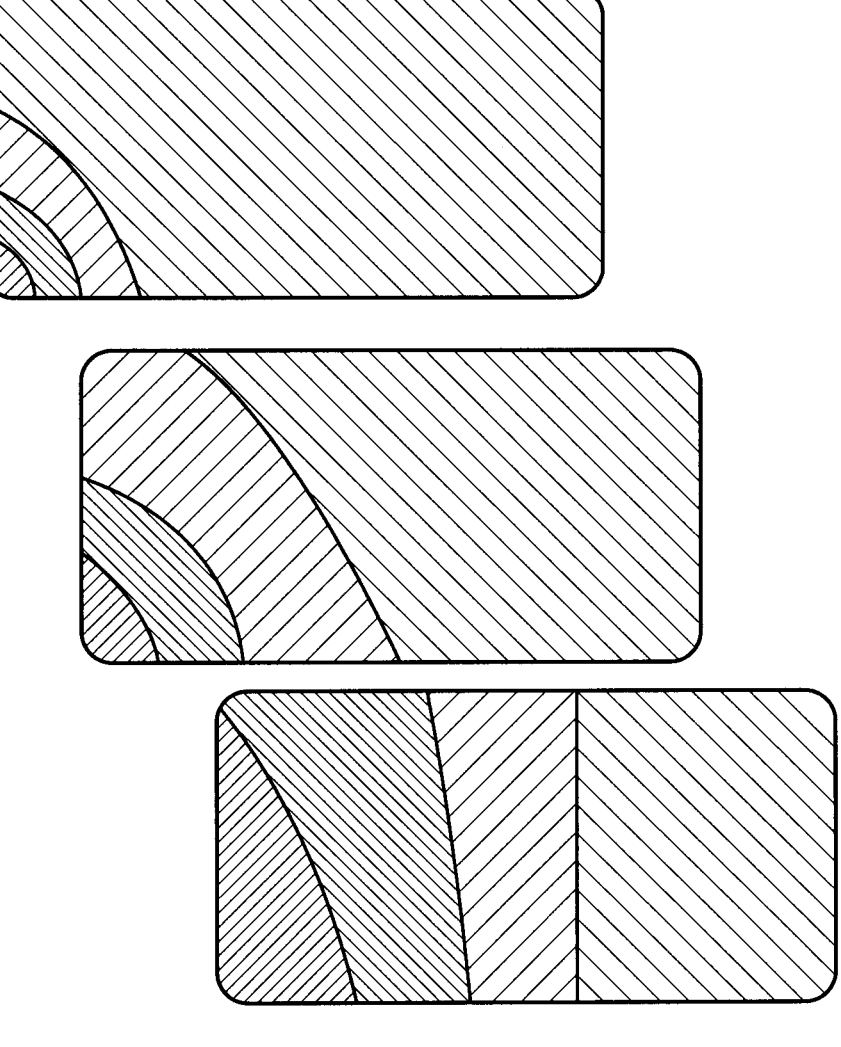
Figure 4C:
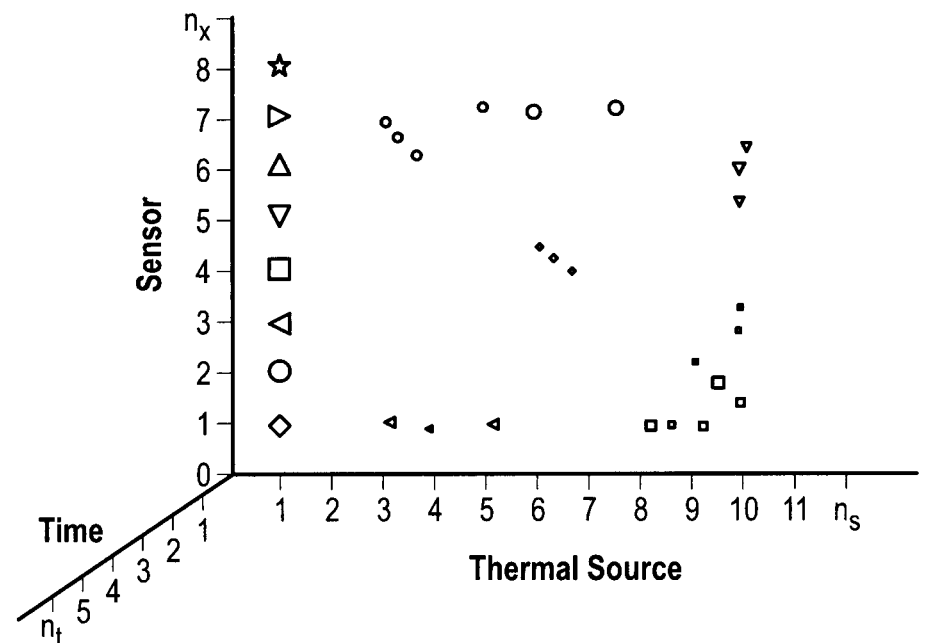
Figure 4D:
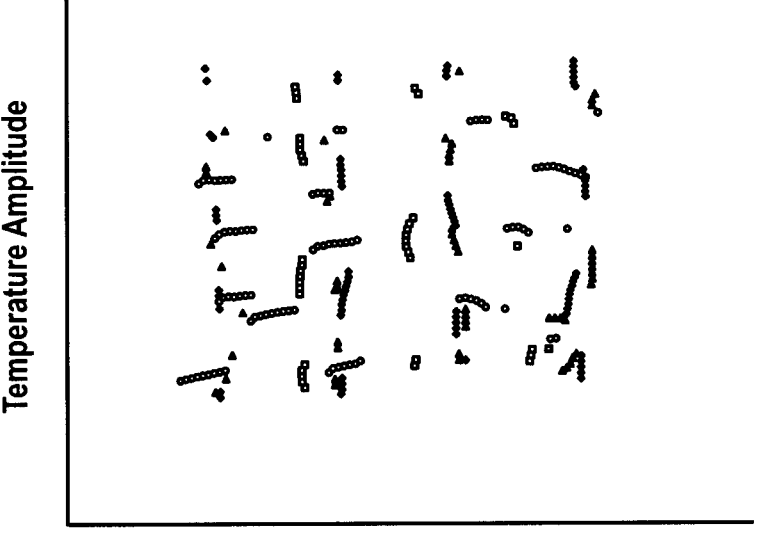

Turning to FIGS. 4A-4D, FIG. 4A provides an example of a digital model that corresponds to a particular mapping of thermal properties of a given area or volume. As such, these thermal properties are undergoing a thermal analysis for identification by a rock thermal sensing system. By simulating multiple thermal signals with multiple thermal sources, distributed temperature data may be acquired for various boundaries of a rock sample for the digital model. In FIG. 4B, distributed temperature data is unrolled at every time step in the thermal analysis to determine a stacked 2D representation of temperature data. The top stack in FIG. 4B corresponds to the initial time step, while the lowest stack in FIG. 4B corresponds the last time step in the thermal analysis. In FIG. 4C, distributed temperature data is illustrated in a temperature volume, where sensor measurements are shown on the y-axis and thermal sources are identified on the x-axis. Furthermore, different time steps are identified using the z-axis of FIG. 4C. FIG. 4D shows distributed temperature data where the y-axis illustrates various temperature amplitudes and the x-axis identifies a particular temperature sensor for a particular position on one or more boundaries.

Returning to FIG. 3, in Block 350, geological data are determined for a rock sample using predicted thermal property data, one or more machine-learning models, and/or distributed temperature data in accordance with one or more embodiments. Using predicted thermal property data, for example, various relationships may be used between thermal conductivity and geological properties, such as porosity, wave velocity and density, to determine specific geological properties. Based on a lithological classification of a particular rock sample, for example, specific geological data may be determined, such as density data, porosity data, longitudinal wave velocity data, transverse wave velocity data, and resistivity data.

Furthermore, geological data may also be determined for use in hydrocarbon exploration and production. Due to its sedimentary characteristics and natural fractures, oil shales may show certain thermal anisotropy characteristics. For example, the anisotropic thermal conductivity may change as a function of temperature, where this change may affect the temperature field distribution and heating efficiency during the in situ electric heating pyrolysis of oil shale. Likewise, flat minerals such as clay minerals may be oriented parallel to the bedding direction of a formation. The arrangement of such minerals may form a natural barrier to fluid flow in the direction of perpendicular to beddings, resulting in low thermal conductivity in the direction of perpendicular to beddings. Thus, predicted thermal conductivity data may be used to both identify specific types of petrophysical geological classifications as well as to determine geomechanical and geochemical characteristics from predicted thermal property data.

In some embodiments, geological data is predicted using one or more machine-learning models in addition to or in place of the machine-learning model in Block 340. For example, distributed temperature data, lithological rock classification, thermal signal type, and other known geological properties may be input features to an artificial neural network that predicts a specific geological property. For example, predicted geological data may include predicted porosity data and/or predicted permeability data.

In some embodiments, geological data is determined using distributed temperature data and reflectance spectroscopy data. More specifically, reflectance spectroscopy may be acquired using one or more types of reflectance spectrometers. For example, a reflectance spectrometer may use point-probe technology with multiple optical fibers that provide light sources and/or collect reflected light for an optical detector. Likewise, reflectance spectroscopy data may quantitatively measures color data and intensity data of reflected light, such as from the visible light spectrum, near-infrared electromagnetic spectrum (from 780 nm to 2500 nm), and ultraviolet light. In some embodiments, a reflectance spectrometer may be included in a rock thermal measurement system, and coupled to a thermal sensing manager. Likewise, reflectance spectroscopy data may be associated with corresponding locations of distributed temperature data for use in a machine-learning workflow.

Figure 5A:
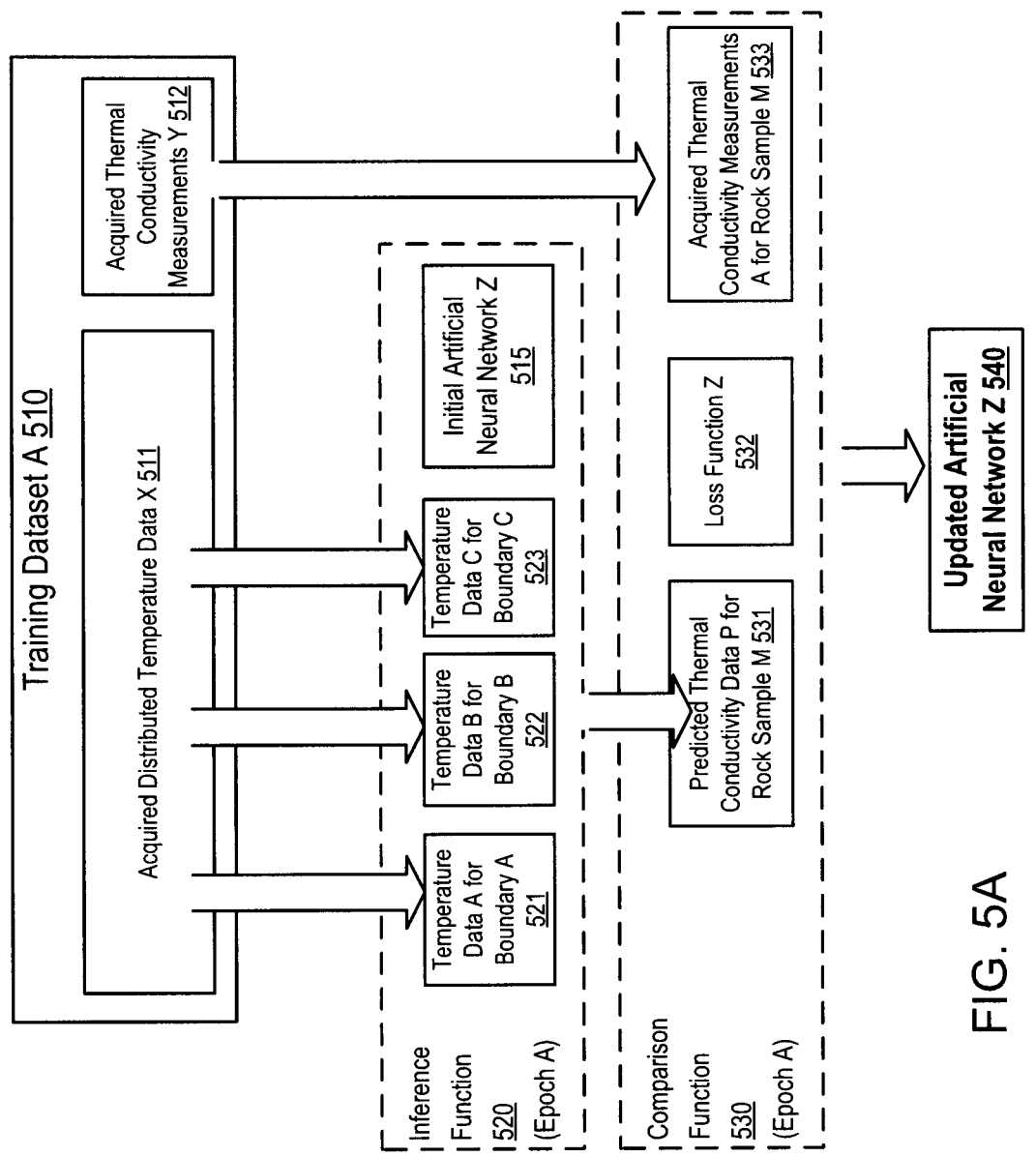
Figure 5B:
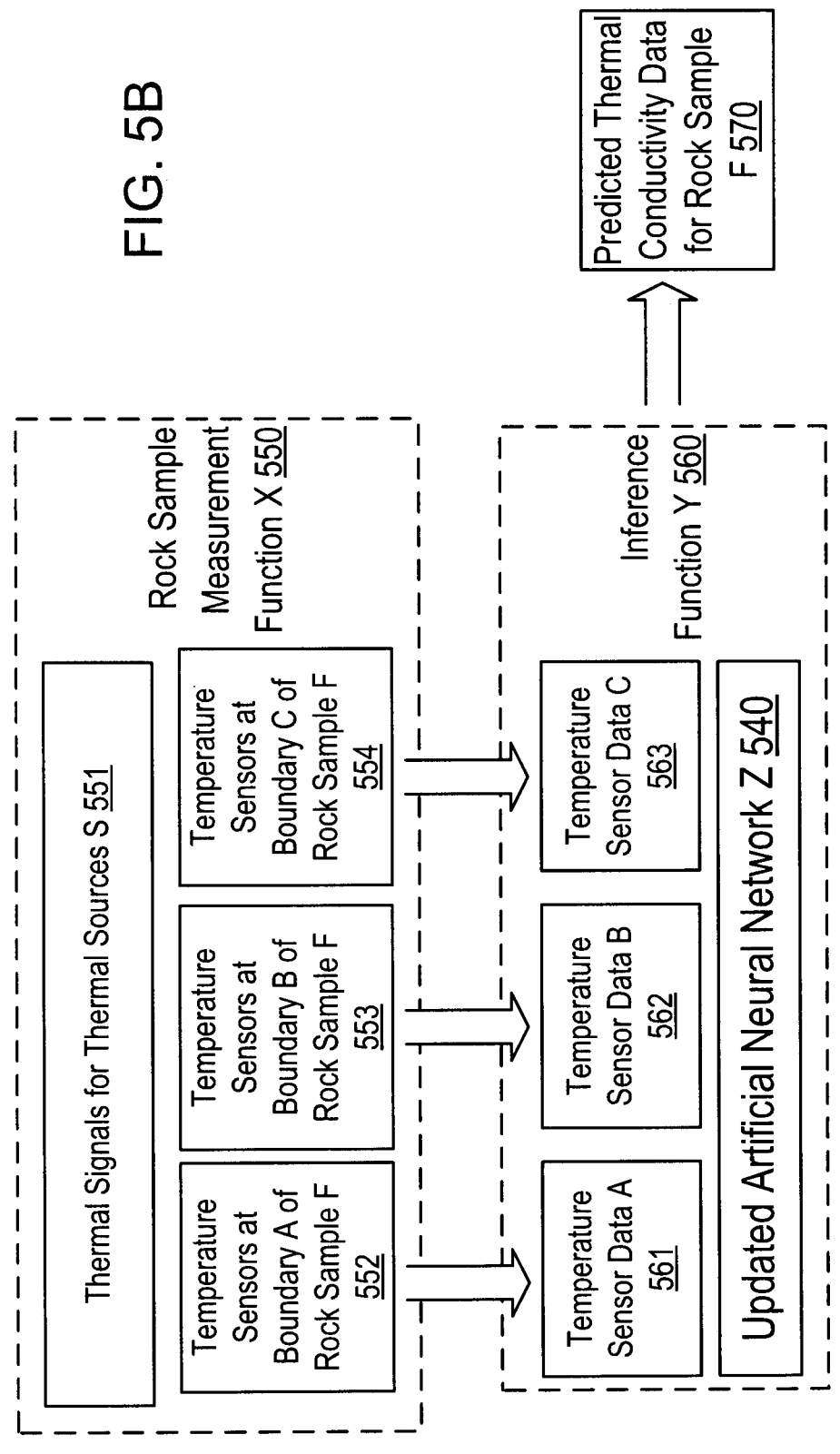

Turning to FIGS. 5A-5B, FIGS. 5A-5B provide an example of training an artificial neural network to predict thermal conductivity data in accordance with one or more embodiments. The following example is for explanatory purposes only and not intended to limit the scope of the disclosed technology. In FIG. 5A, a thermal sensing manager (not shown) obtains a training dataset A (510) that includes acquired thermal conductivity measurements Y (512) and acquired distributed temperature data X (511). In particular, the training dataset A (510) includes data pairs for both distributed temperature data acquired from sensors coupled to a respective rock sample and corresponding thermal conductivity measurements acquired for the same respective rock sample. In a machine-learning epoch A, the thermal sensing manager obtains an initial artificial neural network Z (515) and input data, i.e., temperature data A (521) for boundary A, temperature data B (522) at boundary B, and temperature data C (523) at boundary C. Boundaries A, B, and C correspond to different contact surfaces for temperature sensors of a rock sample M located within a rock thermal measurement system. Using an inference function (520), the thermal sensing manager uses the temperature data (521, 522, 523) and the initial artificial neural network Z (515) to determine predicted thermal conductivity data P (531). Using a comparison function (530), the thermal sensing manager analyses the predicted thermal conductivity data P (531) for rock sample M in view of acquired thermal conductivity measurements A (533) for the actual rock sample. Based on the difference between the predicted thermal conductivity data P (531) and the acquired thermal conductivity measurements A (533), the thermal sensing manager uses a loss function Z (532) to update the initial artificial neural network Z (515) to produce the updated artificial neural network Z (540).

In FIG. 5B, a thermal sensing manager perform a rock sample measurement function X (550) on a rock sample F. In particular, the thermal sensing manager operates a rock thermal measurement system for analyzing rock sample F. Initially, the thermal sensing manager applies thermal signals S (551) to the rock sample F to produce a particular thermal response that is measured by temperature sensors (552) at boundary A, temperature sensors (553) at boundary B, and temperature sensors (554) at boundary C of rock sample F. Afterwards, the thermal sensing manager collects distribution temperature data for the thermal response, i.e., temperature sensor data A (561), temperature sensor data B (562), and temperature data C (563). Using the temperature sensor data (561, 562, 563) as inputs to the updated artificial neural network Z (540) and an inference function Y (560), the thermal sensing manager determined predicted thermal conductivity data (570) for rock sample F.

Figure 6:
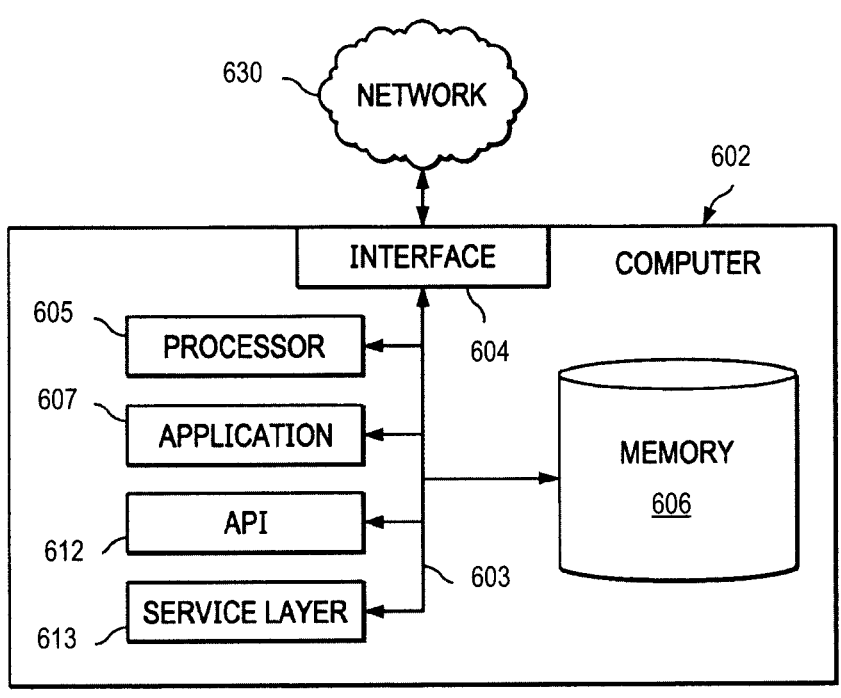
FIG. 6 shows a computer system in accordance with one or more embodiments.

Embodiments may be implemented on a computer system. FIG. 6 is a block diagram of a computer system (602) used to provide computational functionalities associated with described algorithms, methods, functions, processes, flows, and procedures as described in the instant disclosure, according to an implementation. The illustrated computer (602) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

In some embodiments, the computer (602) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, comprising:
determining, by a computer processor, a thermal signal for a thermal analysis of a rock sample;
transmitting, by the computer processor, a plurality of commands to a plurality of thermal sources to produce a plurality of heat emissions, wherein a respective command among the plurality of commands causes a respective thermal source among the plurality of thermal sources to produce a respective heat emission based on the thermal signal;
determining, by the computer processor, distributed temperature data of the rock sample using a plurality of distributed temperature sensors in response to producing the plurality of heat emissions,
wherein the plurality of distributed temperature sensors are coupled to the rock sample on a first rock surface and a second rock surface, and
wherein the first rock surface is on an opposite side of the rock sample from the second rock surface; and
determining, by the computer processor, predicted thermal property data of the rock sample using the distributed temperature data and a machine-learning model.

2. The method of claim 1,
wherein the plurality of distributed temperature sensors are disposed in a portion of an optical fiber disposed along the first rock surface of the rock sample,
wherein the plurality of distributed temperature sensors are a plurality of fiber-based distributed temperature sensors selected from a group consisting of a plurality of Fiber Bragg Grating (FBG) sensors and a plurality of sensors based on multi-point Brillouin scattering time-domain reflectometry, and
wherein the plurality of fiber-based distributed temperature sensors determine changes in temperature at different locations in the optical fiber, and
wherein the optical fiber is optically connected to a controller that determines the distributed temperature data.

3. The method of claim 1,
wherein the plurality of distributed temperature sensors comprise a plurality of thermocouples disposed on the first rock surface of the rock sample,
wherein the plurality of thermocouples are electrically connected to a controller, and wherein the controller determines the distributed temperature data.

4. The method of claim 1, wherein the rock sample is disposed in a rock thermal measurement system comprising:
a container that stores the rock sample;
a controller electrically connected to the plurality of distributed temperature sensors, the controller comprising the computer processor; and
a plurality of distributed heatsinks disposed on the second rock surface of the rock sample,
wherein a respective heatsink among the plurality of distributed heatsinks is disposed between adjacent temperature sensors among the plurality of distributed temperature sensors.

5. The method of claim 1, further comprising:
determining a lithological type of the rock sample,
wherein the lithological type, the distributed temperature data, and the thermal signal are inputs to the machine-learning model.

6. The method of claim 1,
wherein the predicted thermal property data describe a heat transfer rate in a plurality of regions in the rock sample.

7. The method of claim 1, further comprising:
determining geological data of the rock sample using the predicted thermal property and reflectance spectrometry data,
wherein the geological data is selected from a group consisting of a porosity, a permeability, and a resistivity of the rock sample.

8. The method of claim 7,
wherein the reflectance spectrometry data is acquired using a reflectance spectrometer selected from a group consisting of a Fourier transform infrared (FTIR), a Raman spectrometer, and ultraviolet-visible (UV-VIS) spectrometer.

9. The method of claim 1,
wherein the machine-learning model is a U-net model comprising an input layer, a plurality of a plurality of downsampling layers, a plurality of upsampling layers, a plurality of pooling layers, and an output layer,
wherein the input layer obtains the distributed temperature data of the rock sample, and
wherein the output layer generates an image comprising a plurality of heat transfer rates in a plurality of regions of the rock sample.

10. The method of claim 1,
wherein the machine-learning model is an artificial neural network comprising a plurality of hidden layers and at least one activation function, a respective hidden layer among the plurality of hidden layers comprising at least one neuron, and
wherein the artificial neural network determines a predicted amount of kerogen in the rock sample using the distributed temperature data.

11. The method of claim 1, further comprising:
acquiring, using a coring system, the rock sample from a well,
wherein the coring system comprises a coring tool.

12. A system, comprising:
a plurality of thermal sources configured to couple to a rock sample;
a first plurality of distributed temperature sensors configured to couple to a first rock surface of the rock sample;
a second plurality of distributed temperature sensors configured to couple to a second rock surface of the rock sample, wherein the first rock surface is on an opposite side of the rock sample from the second rock surface; and a thermal sensing manager coupled to the plurality of thermal sources, the first plurality of distributed temperature sensors, and the second plurality of distributed temperature sensors, the thermal sensing manager comprising a computer processor and a machine-learning model, wherein the thermal sensing manager is configured to perform a method comprising:

determining a thermal signal for a thermal analysis of the rock sample;

transmitting a plurality of commands to the plurality of thermal sources to produce a plurality of heat emissions, wherein a respective command among the plurality of commands causes a respective thermal source among the plurality of thermal sources to produce a respective heat emission based on the thermal signal;

determining distributed temperature data of the rock sample using the first plurality of distributed temperature sensors and the second plurality of distributed temperature sensors in response to producing the plurality of heat emissions; and determining predicted thermal property data of the rock sample using the distributed temperature data and the machine-learning model.

13. The system of claim 12, wherein the first plurality of distributed temperature sensors are a portion of an optical fiber, wherein the optical fiber comprises one or many Fiber Bragg Grating (FBG) elements that determines changes in temperature at different locations in the optical fiber, and wherein the optical fiber is optically connected to the thermal sensing manager.

14. The system of claim 12, wherein the first plurality of distributed temperature sensors comprise a plurality of thermocouples, and wherein the plurality of thermocouples are electrically connected to the thermal sensing manager.

15. The system of claim 12, further comprising:

a container configured to store the rock sample;

a plurality of distributed heatsinks configured to contact the second rock surface of the rock sample, wherein a respective heatsink among the plurality of distributed heatsinks is disposed between adjacent temperature sensors among the second plurality of distributed temperature sensors.

16. The system of claim 12, wherein the method further comprises:

determining a lithological type of the rock sample, wherein the lithological type, the distributed temperature data, and the thermal signal are inputs to the machine-learning model.

17. The system of claim 12, wherein the predicted thermal property data describe a heat transfer rate in a plurality of regions in the rock sample.

18. The system of claim 12, wherein the machine-learning model is a U-net model comprising an input layer, a plurality of a plurality of downsampling layers, a plurality of upsampling layers, a plurality of pooling layers, and an output layer, wherein the input layer obtains the distributed temperature data of the rock sample, and wherein the output layer generates an image comprising a plurality of heat transfer rates in a plurality of regions of the rock sample.

19. The system of claim 12, wherein the machine-learning model is an artificial neural network comprising a plurality of hidden layers and at least one activation function, a respective hidden layer among the plurality of hidden layers comprising at least one neuron, and wherein the artificial neural network determines a predicted amount of kerogen in the rock sample using the distributed temperature data.

20. The system of claim 12, further comprising:

a coring system comprising a coring tool and coupled to a well, wherein the coring system is configured to acquire the rock sample.

* * * * *